United States Patent [19]
Ekkert et al.

[11] Patent Number: 5,806,699
[45] Date of Patent: Sep. 15, 1998

[54] CLOSURE VENT ARRANGEMENT AND FORMING METHOD THEREFOR

[76] Inventors: Len Ekkert, 1133 Florence St., Lemont, Ill. 60439-2901; Jeffrey Ullrich, 5241 Harvey Ave., Western Springs, Ill. 60558; David N. Moore, 23144 W. Lee St., Plainfield, Ill. 60544

[21] Appl. No.: 758,743

[22] Filed: Dec. 6, 1996

[51] Int. Cl.⁶ .................................................. B65D 41/00
[52] U.S. Cl. ........................ 215/250; 215/232; 215/307; 215/350; 220/231; 220/258; 220/278; 220/373
[58] Field of Search ..................................... 215/232, 250, 215/301, 303, 305, 307, 310, 380; 220/231, 258, 267, 278, 359, 373, 374; 264/328.1

[56] References Cited

U.S. PATENT DOCUMENTS

| 3,074,592 | 1/1963 | Stocking | 220/278 |
|---|---|---|---|
| 4,754,889 | 7/1988 | Debetencourt | 215/232 |
| 4,770,305 | 9/1988 | Su | 215/250 |
| 4,785,931 | 11/1988 | Weir et al. | 206/222 |
| 4,795,043 | 1/1989 | Odet et al. | 215/235 |
| 4,884,705 | 12/1989 | Debetencourt | 215/250 |
| 4,993,569 | 2/1991 | Osip et al. | 215/226 |
| 5,082,136 | 1/1992 | Schumann . | |
| 5,273,171 | 12/1993 | Steele-Rowland et al. | 215/11.1 |

*Primary Examiner*—Stephen Cronin
*Attorney, Agent, or Firm*—Welsh & Katz, Ltd.

[57] ABSTRACT

A venting closure for use with an associated container includes a closure cap having a circular top wall portion and a depending annular skirt portion. The closure is used with a pressurized container having a threaded neck portion defining a land surface at the top thereof. The closure includes a liner therein adjacent and in spaced relation to the top wall, which liner is positioned between the top wall portion and the land surface and defines a pressure release region with the top wall portion. The top wall portion includes an outwardly extending annular bead-like protecting element having a depending inner wall and a contiguous outer wall. The inner wall is oriented generally transverse to a top wall plane. A flexible portion having a piercing element extending inwardly therefrom toward the liner is positioned centrally of the annular protecting bead and is movable so that piercing element contacts and fractures the liner to release pressure from the container. The bead inner depending wall and the outer wall define a vent channel in flow communication with the pressure release region, and the inner wall includes at least one vent opening for providing flow communication to vent the gas from the container toward the center of the closure. A method of forming the venting closure includes providing a mold assembly having a female mold member and cooperating, engageable inner and outer male mold cores and a gate insert, assembling the mold to form a mold cavity, engaging the projections with the at least one landing surface, injecting a plastic material into the mold cavity, forming a plurality of vertically oriented vent openings defining horizontally oriented vent paths in the protective bead depending wall, and disassembling the mold and removing the closure.

14 Claims, 4 Drawing Sheets

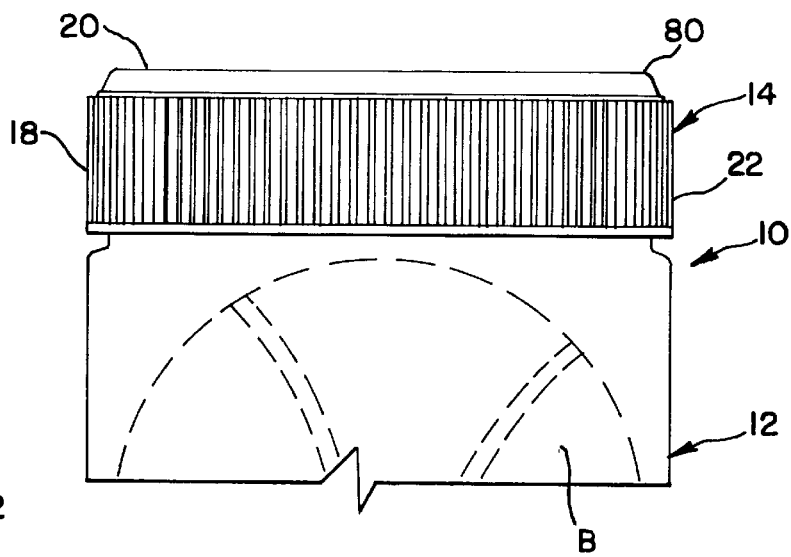
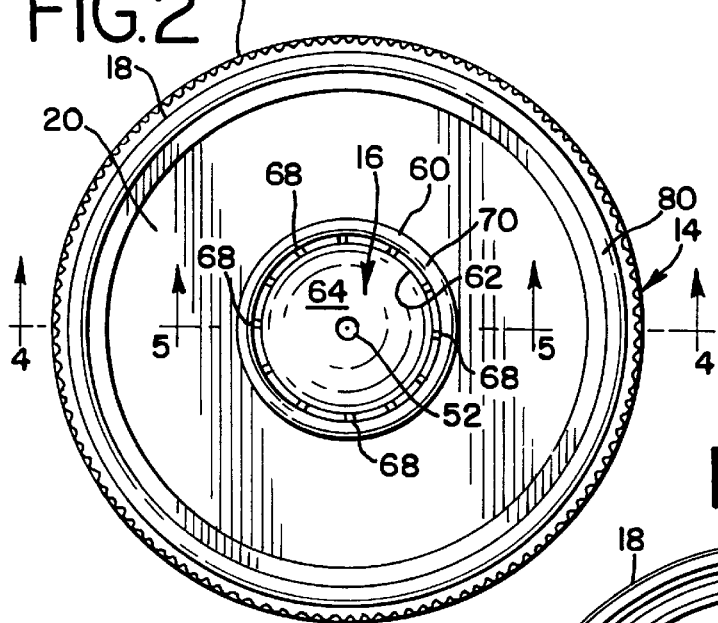
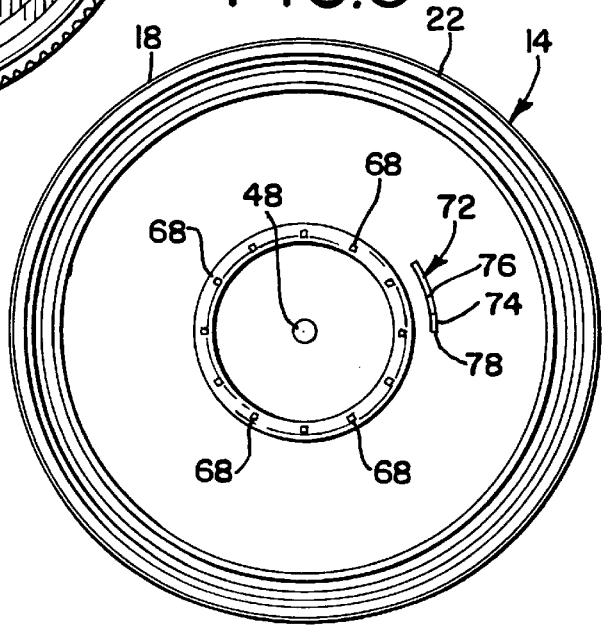

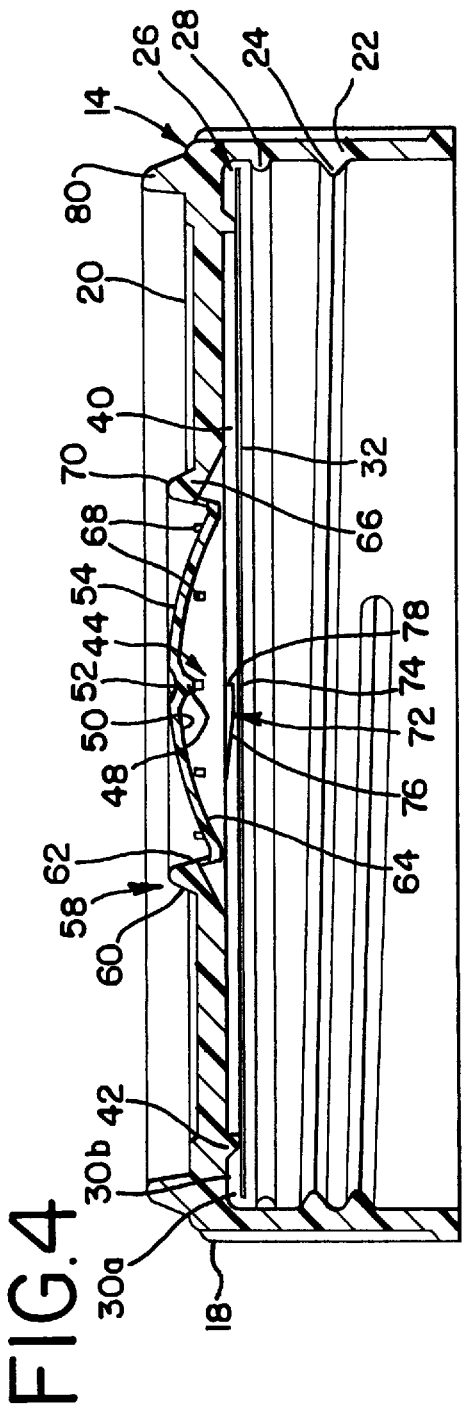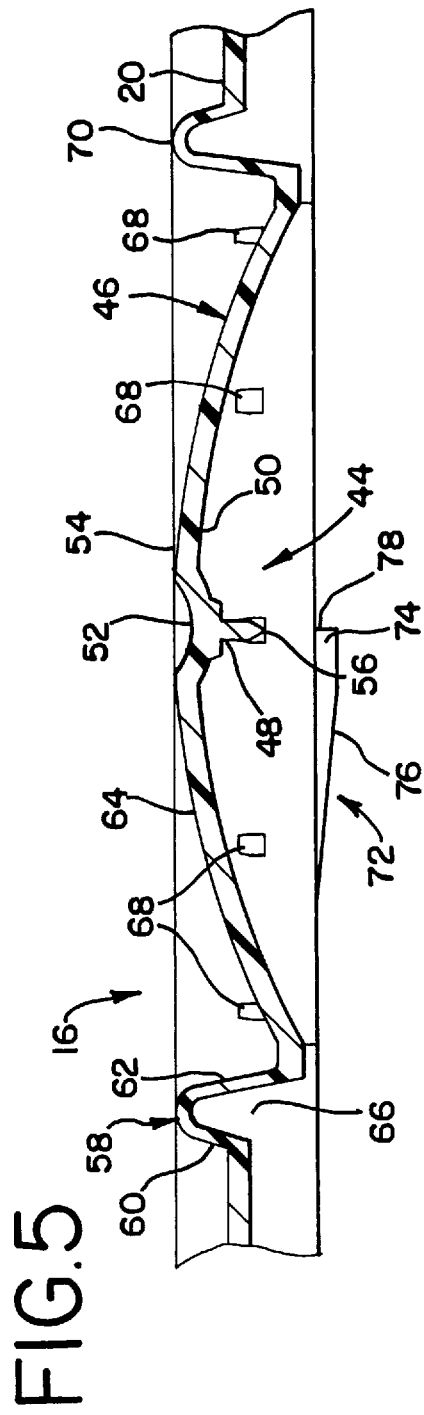

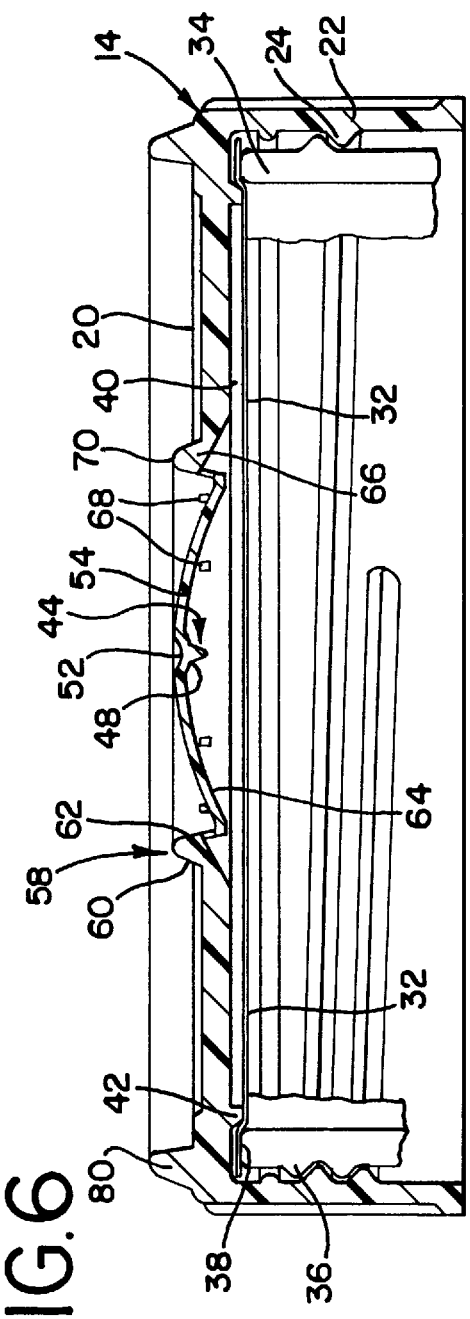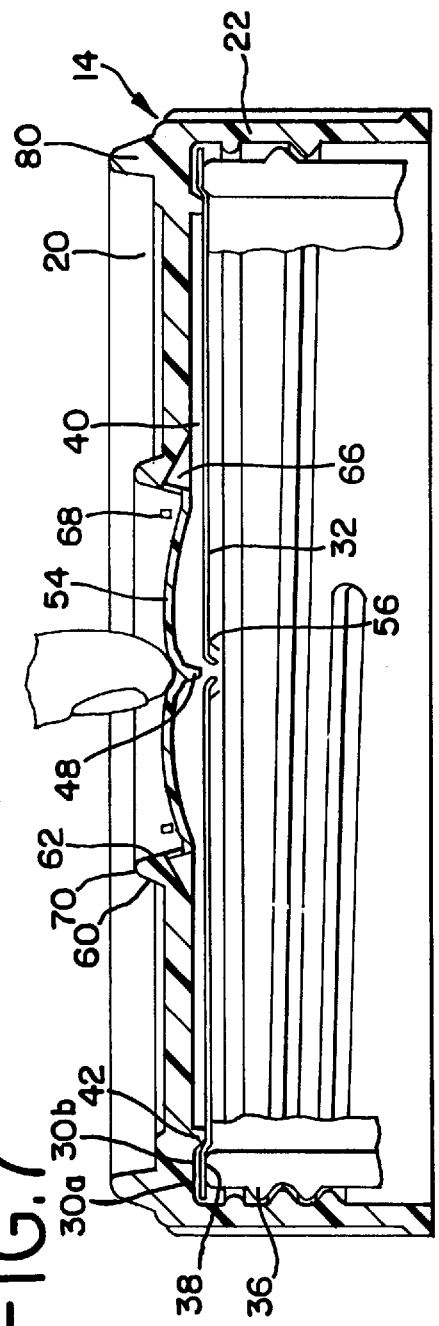

CLOSURE VENT ARRANGEMENT AND FORMING METHOD THEREFOR

FIELD OF THE INVENTION

This invention relates to a container closure vent arrangement More particularly, the invention relates to a self contained piercing vent arrangement for a pressurized container.

BACKGROUND OF THE INVENTION

Pressurized containers are known in the art for storing pressurized athletic balls, such as tennis balls, racquetballs and the like. Typically such balls are internally pressurized to provide a desired "bounce". As the balls lose internal pressure, they tend to lose their bounce.

It will be commonly recognized that such balls lose their bounce over time. This is due in part, to the loss of pressurized gas across the wall of the ball. Pressure loss occurs whether or not the ball is used, as a natural consequence of the internal pressurization and transport of the pressurized gas across the ball wall, from the higher pressure ball interior to the lower pressure environs outside of the ball.

To reduce the amount of gas loss across the ball wall, the aforementioned pressurized containers have come into widespread use. It will be recognized by those skilled in the art that a smaller pressure differential across the ball wall, e.g., storage in a pressurized container, reduces the driving force for loss of pressure from the ball interior. In one common configuration, a metal or plastic container having one or more balls stored therein is pressurized. The container has a removable seal across the top thereof. The seal is typically formed of a like metal or plastic. The seal includes a pull ring to facilitate removal of the seal.

One drawback to the removable seal arrangement is that the seal element requires disposal after it is removed from the container. While on a tennis or racquetball court, it may be inconvenient for a user to do so. Another drawback is that the seal members, and particularly metal seal members, may have a sharp edge. The sharp edge on the seal member can be a hazard to the user, and can cause severe lacerations of the hand or fingers if handled improperly.

It has also been observed that dust and other small, dust-like foreign objects may be ejected from a pressurized container upon first or initial opening of the container. This too can be hazardous with the known seal element arrangement, because the pressurized gas can be released from the container upward, possibly toward the user.

Accordingly, there continues to be a need for a pressurized container vent arrangement, which vent arrangement is self contained, and reduces or eliminates waste from the container seal. Such a container should provide an indirect gas venting or release path to direct the released gas away from the user.

SUMMARY OF THE INVENTION

A venting closure for use with an associated container for storing items under pressure includes a circular top wall portion and a depending annular skirt portion. The closure is threadedly engaged with the container and has a liner positioned therein between the top wall portion and the container to form a seal at the container. The liner may be bonded to the container.

The top wall portion has an annular protective bead or ring extending outwardly therefrom. The bead has an outer wall and a depending inner wall defining a radially oriented bellows-like region. The top wall has a flexible region central of the protective bead which includes a semi-spherical wall spanning the depending inner wall.

The flexible portion includes a piercing element central thereto, directed inwardly of the closure. The liner and the top wall portion define a pressure release region therebetween. The outer and depending inner walls define a vent channel therein in flow communication with the pressure release region. The depending inner wall, which is oriented transverse to a top wall plane includes a plurality of vent openings therein which provide flow communication between the pressure release region and an area outside of the container.

The flexible region is urged inward of the container which urges the piercing element into contact with the liner. The piercing element pierces or fractures the liner to release the pressurized gas from the container. The pressurized gas flows from the container, through the open liner, into and through the pressure release region and the vent channel, and discharges to the environs through the vent openings. Advantageously, the vent openings direct the gas radially inward of the closure, in a direction generally parallel to the top wall plane, away from the user.

The protective bead-like element extends outwardly from the top wall portion at least as far as the flexible region to prevent inadvertent depression thereof. The bead further provides a support surface for stacking containers one on top of another for storage, shipping and the like. The closure may include an outer annular protective and stacking ring or bead.

In a preferred embodiment, the top wall includes an annular, circumferential spacer element depending therefrom, inward of the skirt portion. The spacer element maintains the liner appropriately spaced from the top wall portion to maintain the pressure release region space. In a most preferred embodiment, the closure includes eight equally circumferentially spaced vent openings.

A method of forming the venting closure includes providing a mold assembly having a female mold member defining opposingly oriented core receiving openings, cooperating, engageable inner and outer male mold cores and a gate insert. The inner mold core has a plurality of projections extending therefrom, and the gate insert having at least one landing surface for cooperating with the projections.

The method includes assembling the mold to form a mold cavity, engaging the projections with the at least one landing surface, injecting a plastic material into the mold cavity, forming a plurality of vertically oriented vent openings defining horizontally oriented vent paths in the protective bead depending wall, and disassembling the mold and removing the closure.

Other features and advantages of the present invention will be apparent from the following detailed description, the accompanying drawings, and the appended claims.

BRIEF DESCRIPTION OF THE FIGURES

FIG. 1 is a partial front elevational view of a pressurized package for storing pressurized athletic balls, including a container engaged with a closure having a vent arrangement embodying the principles of the present invention;

FIG. 2 is a top plan view of the closure of FIG. 1;

FIG. 3 is a bottom view of the closure of FIG. 1, illustrating the inside of the closure;

FIG. 4 is a cross-sectional view taken along line 4—4 of FIG. 2;

FIG. 5 is a partial cross-sectional view taken along line 5—5 of FIG. 2;

FIG. 6 is a cross-sectional view similar to FIG. 4, showing the closure engaged with the container, with the tearing member removed for clarity of illustration;

FIG. 7 is a cross-sectional view similar to FIG. 6 showing the flexible region depressed and the piercing element as it pierces the liner.

DETAILED DESCRIPTION OF THE PREFERRED EMBODIMENTS

Figure 8:
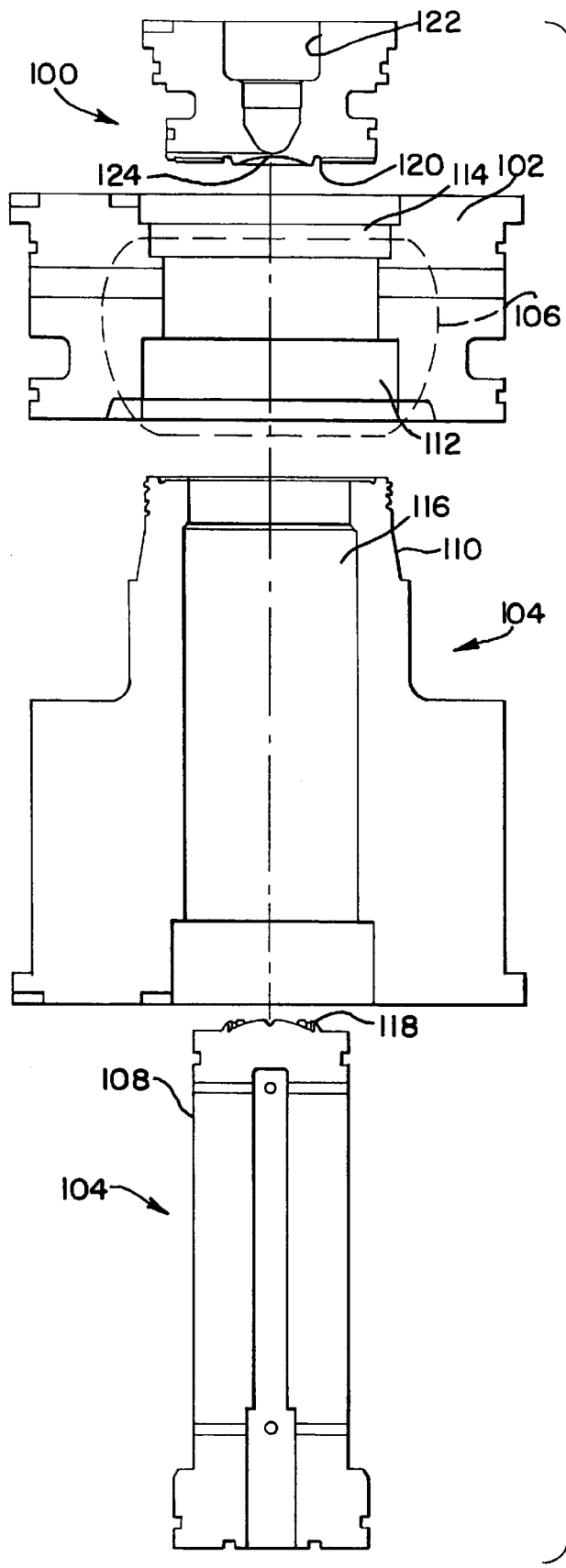
FIG. 8 is an exploded view of an exemplary mold assembly for forming the vent closure of the present invention.
Figure 9:
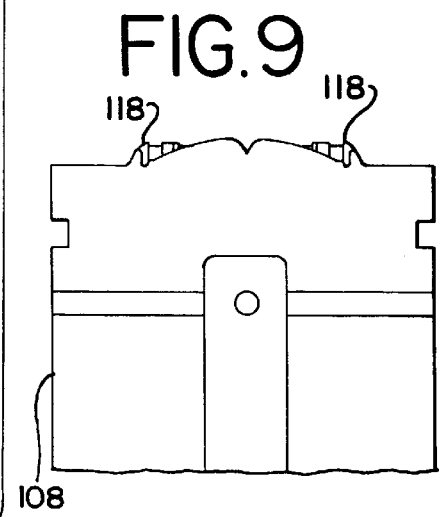
FIG. 9 is a partial side elevational view of the inner male mold portion of the mold assembly, showing the uppermost portion thereof.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring now to the figures and in particular to FIG. 1, there is shown a pressurized packaging arrangement 10 including a container 12 under pressure and a closure 14. The closure 14 includes a vent arrangement 16 in accordance with the principles of the present invention. The package 10 may be used to store items under pressure, for example, tennis balls or racquetballs B. Storing the balls B under pressure prolongs the shelf life thereof by reducing the driving force for loss of pressure from the balls B.

The closure 14 includes a cap 18 having a circular top wall portion 20 and a depending annular skirt portion 22 depending from the top wall 20. The top wall portion 20 defines, generally, a top wall plane P. As best seen in FIG. 4, the skirt portion 22 has a thread formation 24 formed internally thereof. The closure 14 defines a liner retaining region 26 at about a juncture of the top wall portion 20 and the skirt portion 22. A circumferential liner retaining ring 28 extends inwardly from the skirt portion 22 spaced from the juncture.

The closure 14 may include a pair of liner retaining projections 30a,b depending from the top wall portion 20 to facilitate retaining a liner 32 in place after the liner 32 is positioned in the closure 14 and prior to engaging the closure 14 with the container 12. It will be recognized by those skilled in the art that the liner 32 can be retained in the closure 14 by a variety of different methods and structures, which methods and structures are intended to be within the scope of the present invention.

The closure 14 is configured for use with a pressurized container 12. The container 12 has a neck portion 34 having an externally formed thread 36 thereon to engage the closure thread 24. A land surface 38 is defined atop the neck portion 34, and is that portion of the container 12 which abuts the top wall portion 20 and the liner 32 when the closure 14 is engaged with the container 12. As provided herein, in a typical packaging process, the liner 32 which is initially positioned in the closure 14, will be bonded to the container 12 at the land surface 38 by methods such as heat induction, which methods will be recognized by those skilled in the art.

The liner 32 is a circular, fracturable sealing element. The liner 32 extends generally coextensive with the top wall portion 20 and is configured to provide a seal between the container 12 and the top wall portion 20, as more fully discussed herein. The liner 32 is positioned in the closure 14 in spaced relation to the top wall portion 20. The space 40 between the liner 32 and the top wall portion 20 is maintained by a circumferential spacer element 42, and defines a pressure release region.

As best seen in FIG. 6, when the closure 14 and container 12 are engaged with one another, the liner 32 is held in place by the interaction of the container land surface 38, the liner retaining projections 30 and the spacer element 42.

The top wall portion 20 may include a liner piercing arrangement 44. The liner piercing arrangement 44 is configured to pierce the liner 32 to facilitate depressurizing the container 12 and to provide an indirect flow path for the release of the pressurized gas from the container 12. The indirect flow path reduces the opportunity for the gas to escape directly outward from the container 12 toward the user, and possibly toward the user's face. Advantageously, the liner piercing arrangement 44 may also be configured to eliminate the relatively rigid, sharp-edged seal element of known containers. Thus, the opportunity for a user to injure himself or herself by improperly handling such a sharp-edged liner element is reduced or eliminated.

The top wall portion 20 includes a flexible portion 46 at about the center thereof. The flexible portion 46 is configured to flex inwardly and outward, i.e., into and out of the container 12 when the closure 14 is fitted thereto. The flexible portion 46 includes a piercing element 48 on an inner wall 50 thereof, and an indented area 52 on an outer wall 54 thereof corresponding to the piercing element 48. The piercing element 48 is oriented inwardly of the container 12 to contact and fracture the liner 32 when sufficient pressure is applied thereto. The piercing element 48 is best seen in FIGS. 6–7, and is shown in FIG. 7, wherein the piercing element 48 is in contact with the liner 32 and the liner 32 is illustrated in a fractured condition. The piercing element 48 may have a conical or pyramidal shape defining a piercing point 56. Other configurations of the piercing element 48, such as the elongated, tapered end spike-like element illustrated in FIG. 5 may be used.

The top wall portion 20 includes an inner, annular protective bead-like element or ring 70, which extends outwardly therefrom. The bead 70 includes an one annular, outer, axially outwardly extending wall 60 (i.e., extending outward of the container), contiguous with an annular, inner, axially inwardly extending, depending wall 62 (i.e., extending inwardly of the container). The inner wall 62 lies generally transverse to the top wall plane P.

The inner and outer walls 60, 62 define a radially oriented bellows-like configuration, illustrated at 58 in FIG. 5. An outwardly extending diaphragm-like or semi-spherically shaped element 64 is central to the annular bead 70. The piercing element 48 is centrally formed on the diaphragm-like element 64, and can be urged into contact with the liner 32 by depressing the diaphragm-like element 64 at about the indented area 52 at the center thereof.

The bead 70, defines the walls 60, 62 which define an annular vent channel 66. The vent channel 66 is open to, or in flow communication with the pressure release region 40 which is located between the liner 32 and the top wall portion 20. The inner wall 62, adjacent to the juncture with the diaphragm-like element 64 includes a plurality of vent openings 68 therein. The openings 68 lie in a plane generally transverse to the top wall plane P.

The vent openings 68 are in flow communication with the vent channel 66 and are open to an area outside of the container 12, i.e., open to the environs. The vent openings 68 thus provide a flow path from the pressure release region 40 to the environs. In a current embodiment, the closure 14 includes eight equally, circumferentially spaced vent openings 68 in the inner wall 62.

As seen in FIGS. 5–6, the vent openings 68 are formed in the depending inner wall 62. The inner wall 62 which is oriented transverse to the top wall plane P, directs gas which escapes from the container 12 in a direction generally parallel to the top wall plane P toward the center of the closure 14. Directing the escaping gas toward the center of the closure 14 greatly reduces the opportunity for gas to flow or rush toward a user's face. This novel arrangement provides a vent path for the escaping gas which is directed radially inward of the closure and away from the user.

The protective inner bead 70 provides protection from inadvertent depression of the diaphragm-like element 64 and thus piercing of the liner 32. In a current embodiment, as best seen in FIG. 5, the inner protective bead 70 extends upwardly at least about as far as the top of the diaphragm-like element 64. The protective bead 70 also facilitates stacking of containers 14 one on top of another for, for example, storage, shipping and handling, and merchandise display.

The closure 14 may include a liner tearing member 72. As illustrated in FIGS. 3–5, the tearing member 72 includes a depending tearing element 74 having a ramped portion 76 and a contacting wall 78. The tearing member 72 tears the liner 32, after it has been fractured by the piercing element 48, as the closure 14 is threadedly disengaged from the container 12. The ramped portion 76 prevents inadvertent tearing of the liner 32 when the closure 14 is engaged with, or disengaged from the container, prior to fracturing the liner 32.

The tearing member 72 is oriented so that the ramped portion 76 contacts the liner 32 as the closure 14 is threaded onto the container 12. Conversely, the contacting wall 78 contacts the liner 32 as the closure 14 is threadedly disengaged from the container 12 after the liner 32 has been pierced.

The closure 14 may also be formed with an outer annular protective ring 80. The outer ring 80 provides additional protection against inadvertent depression of the diaphragm-like element 64, and also, provides an additional support surface for stacking containers on top of one another. The stacked arrangement facilitates an economical shipping arrangement for containers using such a closure, and further facilitates storage and merchandizing arrangements which a retailer or other seller may wish to use.

Use of the venting closure 14 is quite simple. As illustrated in FIG. 7, by using finger pressure at the indented area 52, a user depresses the diaphragm-like element 64 inwardly. The piercing element 48 is urged downwardly, and contacts and pierces the liner 32. Piercing the liner 32 allows the pressurized gas in the container 12 to escape. The gas from the container 12 enters the pressure release region 40 and flows into the vent channel 66. The gas then flows from the pressure release region 40 through the vent channel 66 and the vent openings 68 to the environs. As provided herein, the vent openings 68 direct the gas radially inward of the closure 14 and thus away from the user.

The closure 14 is then threaded from the container 12. As the closure 14 is unscrewed, the tearing member 72 contacts the liner 32 and tears it away from the container 12. The closure 14 is then fully removed from the container 12, and the balls can be removed therefrom.

The closure 14 is formed by an injection molding process. The mold assembly 100 includes a female core member 102 and a multiple part male core 104 which, when engaged with one another define a mold cavity 106. The male core portion 104 includes cooperating inner and outer annular mold cores 108, 110 and a gate insert 111. The female core 102 has first and second opposingly oriented mold receiving openings 112, 114.

The outer male mold portion 110 engages and cooperates with the first mold receiving opening 112 to form, in part, a mold cavity for forming part of the top wall 20, the depending skirt portion 22 and threads 24 of the closure 14. The outer male mold 110 portion includes an open central region 116 for receiving the inner male mold portion 108.

The inner male mold portion 108 slides within the outer male portion 110 and forms, in part, a mold cavity for forming the inner surfaces of the protective bead 70, the vent channel 66 and the flexible dome 64. The inner male portion 108 includes projections 118 extending therefrom to, in part, form the vent openings 68.

The gate insert 111 is configured to engage the female core 102 at the second receiving opening 114. The gate insert 111 in conjunction with the inner and outer male mold cores 108, 110 defines the mold cavity 106 for forming the closure 14. The gate insert 111 includes landing surfaces 120 which coact with the projections 118 to form bridge-like connections between the insert 111 and the inner male core 108, around which the vent openings 68 are formed. An injection port or gate 122 is preferably positioned in the gate insert 111 and includes an opening 124 through which plastic is injected into the mold cavity 106.

The mold 100 is assembled by inserting or positioning the insert gate 111 and the male portions 108, 110 into one another and into the female core portion 102, accordingly, as illustrated in FIG. 8, which shows the mold assembly 100 in an exploded view. When assembled, the mold 100 forms a cavity 106 which defines the closure 14. The configuration of the projections 118, and their respective engagement or abutment with the landing surface 120 provide a mold configuration which permits the formation of the vent openings 68 while facilitating the disassembly or opening of the mold 100, by withdrawing the projections 118 from the vent openings 68, without adversely effecting the formation of the openings 68 and the surrounding plastic material.

The pressurized package 10 is assembled using methods that will be recognized by those skilled in the art. The closure 14 is first formed using the aforementioned process. The liner 32 is then positioned in the closure 14 as illustrated in FIG. 4. The liner 32 is held in place in the closure 14 against the spacer element 42, in part, by the liner retaining ring 28.

The container 12 and closure 14 are then assembled with the liner 32 therein, and the package 10 is sealed, by methods such as heat induction, which methods will be recognized by those skilled in the art. Sealing bonds the liner 32 to the container land surface 38. The seal, which is formed at the juncture of the land surface 38 and the liner 32, permits the closure 14 to be removed from the container 12, with the liner 32 remaining intact, in place on the container 12. The sealed package 10 prolongs the shelf life of the pressurized balls until the liner 32 is pierced and the container 12 is depressurized.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A venting closure for use with an associated container, the container having a threaded neck portion defining a land surface and having an internal volume under pressure relative to an area outside of the container, the closure comprising:

a closure cap having a circular top wall portion defining a top wall plane and a depending annular skirt portion depending from the top wall portion, said skirt portion having an internally formed thread engageable with said container threaded neck, said top wall portion and said skirt portion defining a liner retaining region at about a juncture thereof;

a fracturable liner positioned in said cap coextensive with said top wall portion and extending into said retaining region, said liner being in spaced relation with said top wall portion and being positioned between said top wall portion and the land surface when said closure is threadedly engaged with the container for forming a seal therebetween, said liner and said top wall portion defining a pressure release region, said top wall portion including a flexible portion having a piercing element extending inwardly therefrom toward said liner, said flexible portion being movable between a resting position and a piercing position wherein said piercing element contacts and fractures said liner to release pressure from the container, said top wall portion defining a vent channel positioned in a plane generally parallel to said top wall plane, said vent channel being in flow communication with said pressure release region and further defining at least one vent opening positioned generally transverse to said top wall plane for providing flow communication between said vent channel and the area outside of the container in a direction generally parallel to said top wall plane.

2. The venting closure in accordance with claim 1, wherein said flexible portion includes a circular, radially oriented protective stacking bead having a depending wall defining a bellows-like portion and a semi-spherical wall central of said bellows-like portion, and wherein said piercing element extends inwardly of said semi-spherical wall.

3. The venting closure in accordance with claim 2, said at least one vent opening being formed in said stacking bead depending wall.

4. The venting closure in accordance with claim 2, wherein said vent channel is defined by said stacking bead and said stacking bead depending wall.

5. The venting closure in accordance with claim 2 wherein said semi-spherical wall has an uppermost portion and said protective stacking bead extends generally upwardly, at least as far as said semi-spherical wall uppermost portion.

6. The venting closure in accordance with claim 1 including an annular, circumferential spacer element depending from said top wall portion, inward of said skirt portion, said spacer element being adapted to engage said liner.

7. The venting closure in accordance with claim 1 including eight vent openings.

8. A pressurized venting package for storing items under pressure comprising:

a container having a threaded portion defining a land surface on an uppermost portion thereof and defining an opening therein;

a seal member affixed to said land surface and extending generally over said opening, said seal member adapted to retain pressure in said container; and a closure having a top wall portion defining a top wall plane and having an annular, upwardly extending protective bead-like ring integral with a depending wall portion being formed generally transverse to said top wall plane, said top wall portion defining in part a flexible region central of said bead-like ring and including a depending skirt portion depending from a periphery of said top wall portion, said skirt portion having a thread formation therein for cooperating with said threaded portion of said container for engaging said closure with said container, said closure being positioned on said container with said flexible region adjacent to said seal member, said flexible region including a piercing element depending therefrom configured to contact and pierce said liner when said flexible region is urged inwardly of said container toward said seal member, said top wall portion and said liner defining a pressure release region therebetween, said protective bead depending wall having at least one vent opening therein in flow communication with said pressure release region for providing a flow path from said pressure release region to an area outside of said package, in a direction generally parallel to said top wall plane.

9. The pressurized venting package of claim 8 wherein said inner bellows wall is formed generally transverse to said top wall plane.

10. The pressurized venting package of claim 8 wherein said stacking bead and said stacking bead depending wall define a radially oriented bellows-like portion defining inner and outer bellows walls, and wherein said at least one opening is formed in said stacking bead depending wall at about said inner bellows wall.

11. The pressurized venting package of claim 10 wherein said stacking bead and said stacking bead depending wall define a vent channel in flow communication with said pressure release region and said at least one vent opening.

12. The pressurized venting package of claim 10 including eight equally, circumferentially spaced vent openings.

13. The pressurized venting package of claim 10 wherein said flexible portion includes an upwardly extending semi-spherical wall having an uppermost portion and wherein said protective bead-like ring extends generally upwardly, at least as far as said semi-spherical wall uppermost portion.

14. A method of forming a venting closure, the closure having a circular top wall portion and a depending skirt portion depending from the top wall portion, and including a flexible region in the top wall portion having a protective bead in the top wall portion and a depending vertical wall depending from the bead having at plurality of vent openings therein, comprising the steps of:

providing a mold assembly having a female mold member defining opposingly oriented core receiving openings, cooperating, engageable inner and outer male mold cores and a gate insert, the inner mold core having a plurality of projections extending therefrom, the gate insert having at least one landing surface for cooperating with the projections;

assembling the mold to form a mold cavity;

engaging the projections with the at least one landing surface;

injecting a plastic material into the mold cavity;

forming a plurality of vertically oriented vent openings defining horizontally oriented vent paths in the protective bead depending wall; and disassembling the mold and removing the closure.

* * * * *